(12) United States Patent
Brown

(10) Patent No.: US 6,354,764 B1
(45) Date of Patent: Mar. 12, 2002

(54) APPARATUS FOR MONITORING THE LAYING OF AN UNDERWATER PIPELINE

(76) Inventor: Philip Gwyn Brown, Rowanbank, 17 Craigour Road, Torphins, Aberdeenshire (GB), AB31 4HE ( * ) Notice: Subject to any disclaimer, the term of this patent is extended or adjusted under 35 U.S.C. 154(b) by 0 days.

(21) Appl. No.: 09/462,068

(22) PCT Filed: Jul. 6, 1998

(86) PCT No.: PCT/GB98/02027

§ 371 Date: Jan. 5, 2000

§ 102(e) Date: Jan. 5, 2000

(87) PCT Pub. No.: WO99/01689

PCT Pub. Date: Jan. 14, 1999

(30) Foreign Application Priority Data

Jul. 5, 1997 (GB) .............................................. 9714179
Dec. 20, 1997 (GB) .............................................. 9726838

(51) Int. Cl.[7] .................................................. F16L 1/12
(52) U.S. Cl. ...................................... 405/158; 405/166
(58) Field of Search ............................. 405/154.1, 157, 405/158, 166, 168.3, 169, 171

(56) References Cited

U.S. PATENT DOCUMENTS

| 3,835,707 A |  | 9/1974 | Rosa et al. |  |
|---|---|---|---|---|
| 3,940,855 A | * | 3/1976 | Ver Nooy et al. | ........... 405/158 |
| 3,943,982 A |  | 3/1976 | Lecordier |  |
| 4,155,669 A | * | 5/1979 | Rochelle | ...................... 405/158 |
| 4,164,379 A | * | 8/1979 | Denman | ...................... 405/158 |
| 4,933,917 A |  | 6/1990 | Bruneval |  |
| 5,035,540 A | * | 7/1991 | Hill et al. | ...................... 405/157 |
| 5,197,716 A | * | 3/1993 | Zibilich, Jr. et al. | ......... 405/166 |
| 5,380,129 A | * | 1/1995 | Maloberti et al. | ........... 405/166 |
| 5,691,903 A | * | 11/1997 | Racette, III | .................. 405/158 |
| 6,113,312 A | * | 9/2000 | Norholmen | .................. 405/157 |

FOREIGN PATENT DOCUMENTS

FR 2477667 3/1980

* cited by examiner

Primary Examiner—David Bagnell
Assistant Examiner—Frederick L. Lagman
(74) Attorney, Agent, or Firm—Jacobson Holman, PLLC

(57) ABSTRACT

An apparatus and a method (1; 30; 50) for monitoring the laying of an underwater pipeline (7). The apparatus (1; 30; 50) comprises a body member (9, 11; 31) and a monitoring means (23, 27, 29; 33) connected to the body member (9, 11; 31) for monitoring the pipeline (7) as it is laid. A movement means (21) may be provided to assist movement of the body member (9, 11; 31) with respect to the pipeline (7). A means to position (10, 13) the body member (9, 11; 31) a distance from the pipeline dispenser (6; 47) is also provided, which may be in the form of a tether or a cable (10). A pipeline sealing device comprising a body member for insertion into a pipeline (7), where an explosive material is mounted on the body member. An apparatus and a method for deploying an elongate member (10; 13) within a conduit (7) where the apparatus comprises a body (51) which is coupled to the elongate member (10; 13). A positioning means maintains the body (51) substantially in a known position within the conduit (7).

43 Claims, 6 Drawing Sheets

APPARATUS FOR MONITORING THE LAYING OF AN UNDERWATER PIPELINE

The invention relates to apparatus and a method for monitoring the laying of a pipeline, and particularly where the pipeline is laid from a vessel onto the seabed.

Conventionally, when a pipeline is laid from a vessel such as a reel barge or a lay barge, there is usually a survey vessel in addition to the lay or reel barge, in order to monitor the touch down of the pipe onto the seabed. The survey vessel would typically have an ROV which carries sonar and stereo video equipment which is deployed in the region where the pipe is being laid.

However, the requirement of this survey vessel, and associated ROV equipment, increases the cost of laying a pipeline. In addition, the lay or reel barges can usually continue to lay the pipeline in worse weather conditions than the survey vessel can operate in. Thus, the survey vessel may halt the pipeline laying operation in situations where the reel or lay barge is capable of continuing.

According to a first aspect, the present invention provides apparatus for monitoring the laying of an underwater pipeline, the pipeline being laid from a pipeline dispenser, the apparatus comprising a body member; a monitoring means connected to the body member for monitoring the pipeline as it is laid; the body member being moveable with respect to the pipeline; and a means to position the body member a distance from the pipeline dispenser.

According to a second aspect, the present invention provides a method of monitoring the laying of an underwater pipeline, the method comprising providing a body member moveable relative to the pipeline; providing a means to position the body member a distance from the pipeline dispenser, the body member having monitoring means associated therewith, and paying out the pipeline from the pipeline dispenser, such that the monitoring means provides data with respect to the pipeline as it is laid.

Preferably, the coupling means maintains a distance between the pipeline dispensing mechanism and the body member, and more preferably, the maintained distance is known. Typically, markings are located along the length of the coupling means to indicate the distance between the pipeline dispensing mechanism and the body member.

Typically movement means are provided, preferably on the body member, to assist movement of the body member with respect to the pipeline. The movement means may be a roller mechanism.

Preferably, the pipeline dispensing mechanism is mounted on a vessel at the water surface, where the pipeline is laid from the vessel onto the seabed and typically, the apparatus further comprises a transmission means for transmitting data output by the monitoring means to the vessel.

The body member may be coupled to, or in contact with, the external surface of the pipeline, or alternatively, the body member may be coupled to, or in contact with, the internal surface of the pipeline. Where the body member is in contact with the external surface of the pipeline, the body member may comprise a bore, whereby the pipeline is moveable through the said bore. The monitoring means may comprise a sonar transmitter and a sonar receiver. Alternatively, or in addition, the monitoring means may be a visual viewing means, and may be a video camera.

The body member may comprise a buoyancy means. Alternatively, or in addition, the body member may comprise a self righting means. The apparatus may monitor the pipeline that has passed through the bore of the body member. A second body member may be provided that allows the apparatus to monitor a portion of the seabed prior to the pipeline being laid on that portion of the seabed.

Where the body member is movably coupled to, or in contact with, the internal surface of the pipeline, the body member may be moveable through the internal bore of the pipeline. The monitoring means may be an inertial attitude sensor. The monitoring means may provide for monitoring of variation of the longitudinal axis of the pipeline and the monitoring means may be a pipeline buckle detector.

Typically, a body member is located within the pipeline at the location where the pipeline first makes contact with the sea bed.

The apparatus may further comprise a selective sealing device, interposed in the length of the connection device, which seals the pipeline when operated. Typically, the selective sealing device is an explosive welding device.

According to a third aspect of the present invention there is provided a pipeline sealing device comprising a body member for insertion into a pipeline, and an explosive material associated with the body member, such that triggering of the explosive material expands the body member to seal the internal bore of the pipeline on one side of the body member, from the internal bore of the pipeline on the other side of the body member.

Preferably, the body member comprises a cylindrical member, whereby the explosive material is mounted within the cylindrical member. Typically, the cylindrical member comprises an inner bore which extends into the cylindrical member at one end, and a sealed other end. Preferably, the explosive material is mounted on the inner bore of the cylindrical member. Typically, the cylindrical member is a clearance fit with the inner bore of the pipeline. Preferably, the pipeline sealing device is moveable along the internal bore of the pipeline, and more preferably is coupled to a connection device which moves the pipeline sealing device. Most preferably, the pipeline sealing device is coupled to a connection device of an apparatus for monitoring the laying of an underwater pipeline in accordance with the first aspect of the present invention.

According to a forth aspect, the present invention provides an apparatus for deploying an elongate member within a conduit, the apparatus comprising a body which is coupled to the elongate member, the body being moveable along the longitudinal axis of the conduit, and a positioning means which maintains the body substantially in a known position within the conduit.

According to a fifth aspect, the present invention provides a method of deploying an elongate member within a conduit, the method comprising inserting a body into the conduit, the body being coupled to the elongate member, and the body being moveable along the longitudinal axis of the conduit, and paying out the conduit from a dispenser, the body being maintained substantially in a known position within the conduit by a positioning means.

Typically, the conduit is a pipeline, and preferably, the pipeline is laid onto the seabed from a pipeline dispenser which is typically located at or adjacent the water surface.

Preferably, the body is located within a first portion of the pipeline which is vertically lower than second and third portions of the pipeline adjacent both ends of the first portion.

Preferably, the weight of the body is greater than the weight of the elongate member coupled to and acting upon the body. The invention has the advantage that the weight of the body maintains the body within the first portion of the pipeline as the pipeline is dispensed from the dispenser.

Typically, there is no connection between the body and the dispenser.

Typically, at least one, and preferably more than one, body members are coupled to the elongate member, and a monitoring means is typically mounted on, or connected to the body member for monitoring the pipeline as it is laid underwater and the monitoring means typically comprises a data output.

Typically, the distance between the body and the body member(s) is fixed by the elongate member, such that when the body is stationary with respect to the pipeline, the body member(s) is/are also stationary.

Preferably, the pipeline dispensing mechanism is a reel whereby the pipeline is coiled around the reel prior to dispensing thereof.

Preferably, the movement means permits the body to move substantially freely with respect to the pipeline.

Preferably, movement of the body with respect to the conduit in the radial direction of the conduit is resisted.

In addition, the coupling means further comprises a motive mechanism which permits the body to travel through the pipeline, and to pull the elongate member through the pipeline.

Embodiments of the first, second, third, fourth and fifth aspects of the present invention will now be described, by way of example only, with reference to the accompanying drawings, in which.

Figure 6:
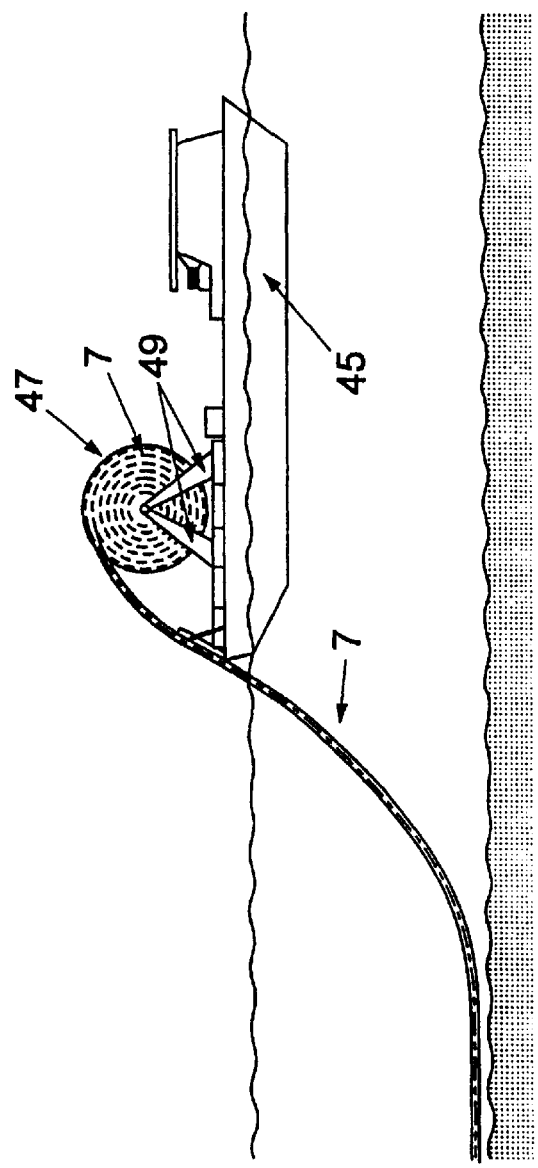
Figure 7:
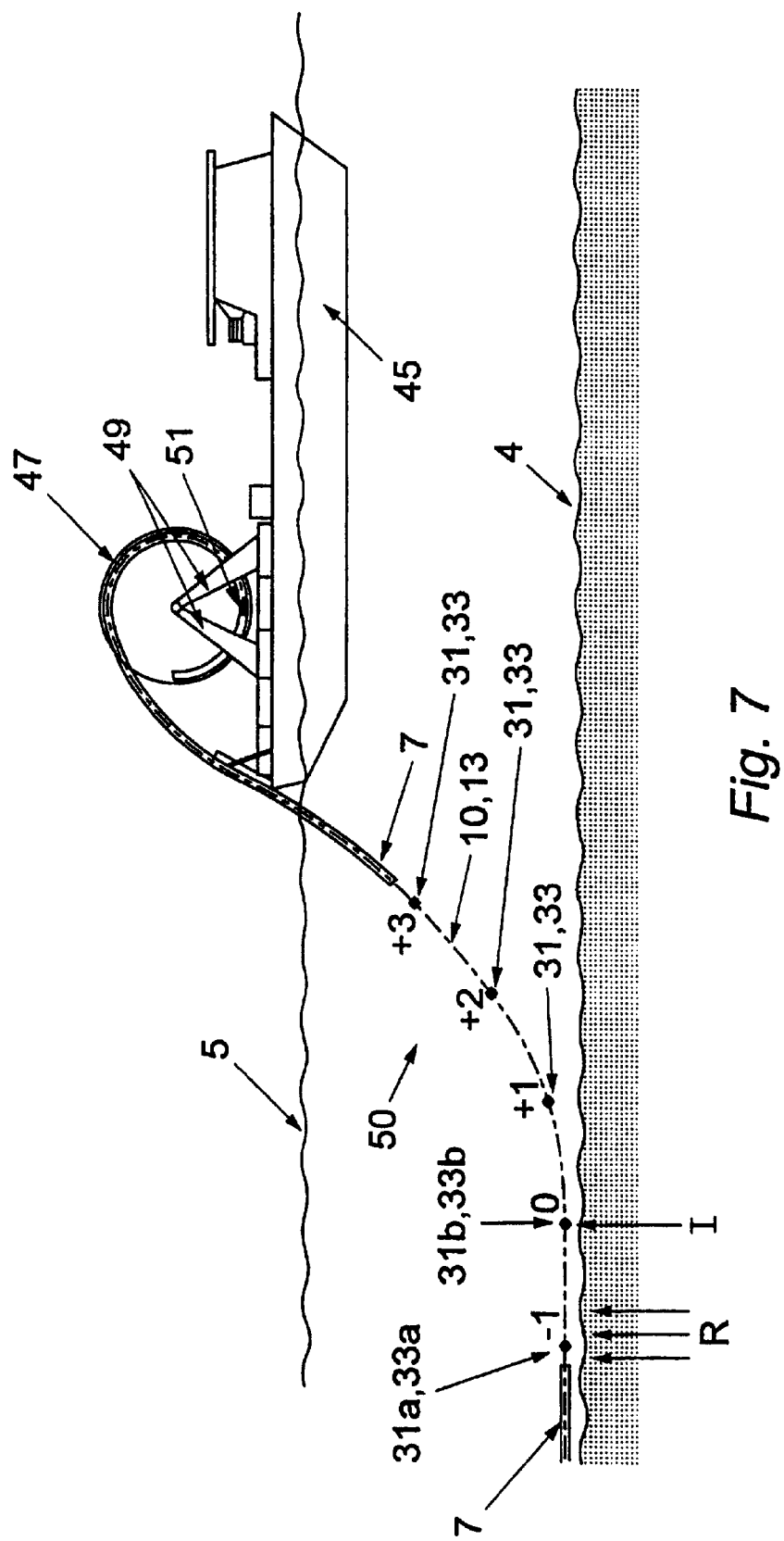

FIG. 6 is a conventional reel laying system for laying a pipeline on the seabed; and FIG. 7 is a side view of a fourth embodiment in accordance with the first aspect of the present invention for monitoring the laying of a pipeline, and an embodiment in accordance with the third aspect of the present invention for deploying an elongate member within a conduit, whilst the pipeline or conduit is being laid from a reel barge onto the seabed.

Figure 1:
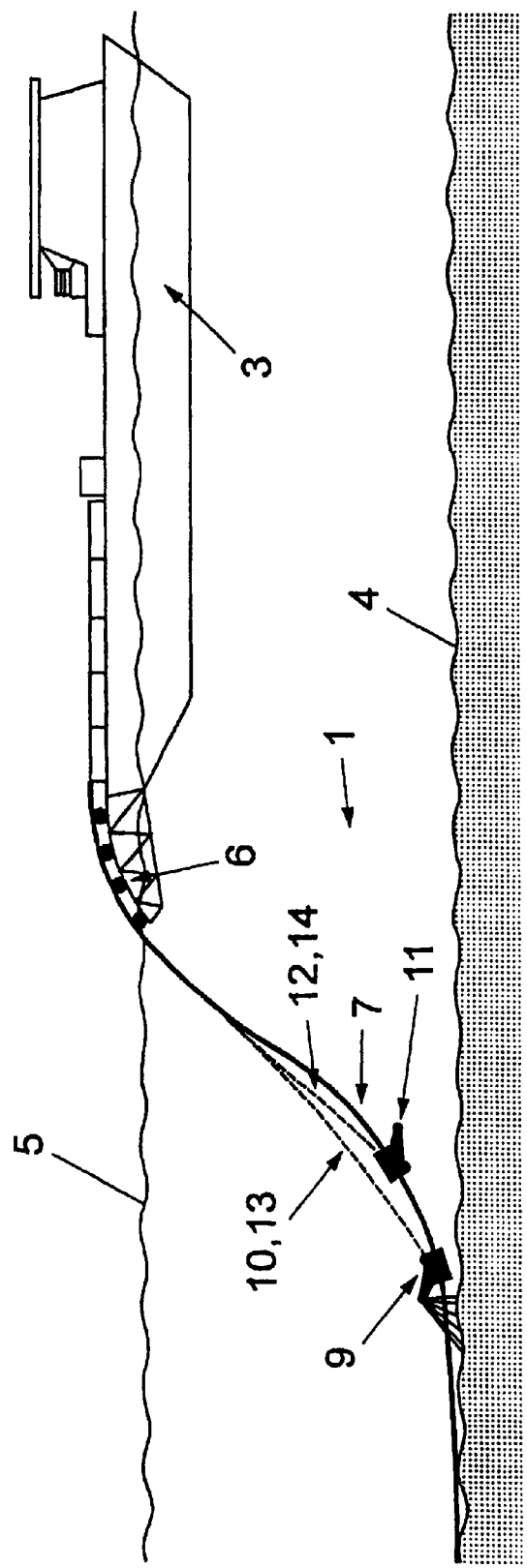
FIG. 1 is a side view of a first embodiment of apparatus for monitoring the laying of a pipeline, whilst the pipeline is being laid from a vessel onto the sea bed, in accordance with a first aspect of the present invention.

FIG. 1 shows a first apparatus 1 for monitoring the laying of a pipeline 7. The pipeline 7 is deployed from a lay barge 3 at the sea surface 5, to the sea bed 4.

A pipeline TouchDown Monitoring system (TDM) 9 in accordance with the first and second aspects of the present invention, is movably coupled to the outer surface of the pipeline 7, and coupled to the barge 3 by cable 10 and control 13 lines. The cable line 10 connects the TDM 9 to the barge 3, and the control line 13 carries data communication signals between the TDM 9 and the barge 3, and provides power to the TDM 9.

Figure 2:
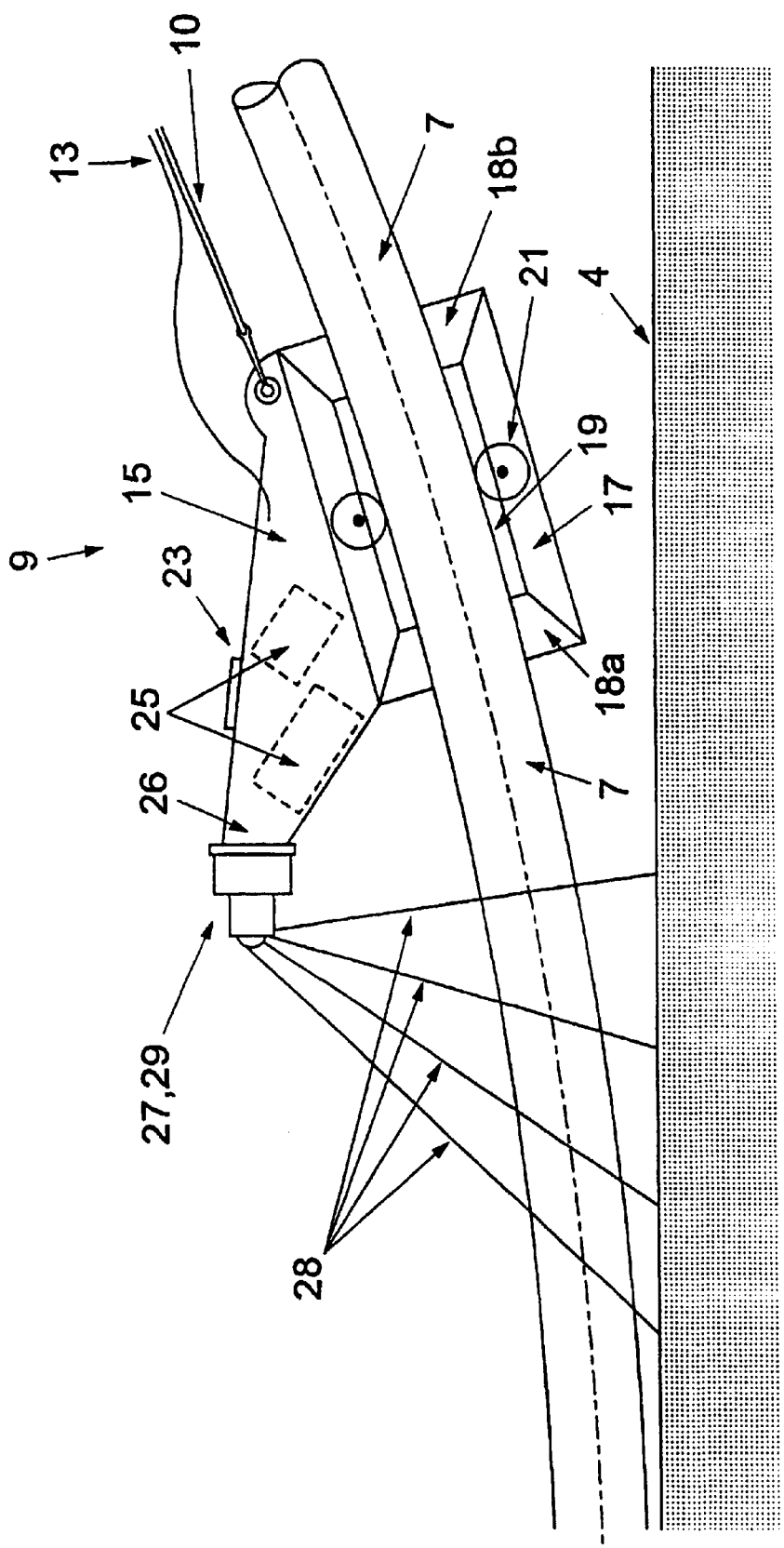
FIG. 2 is a side view of a portion of the apparatus of FIG. 1.
Figure 3:
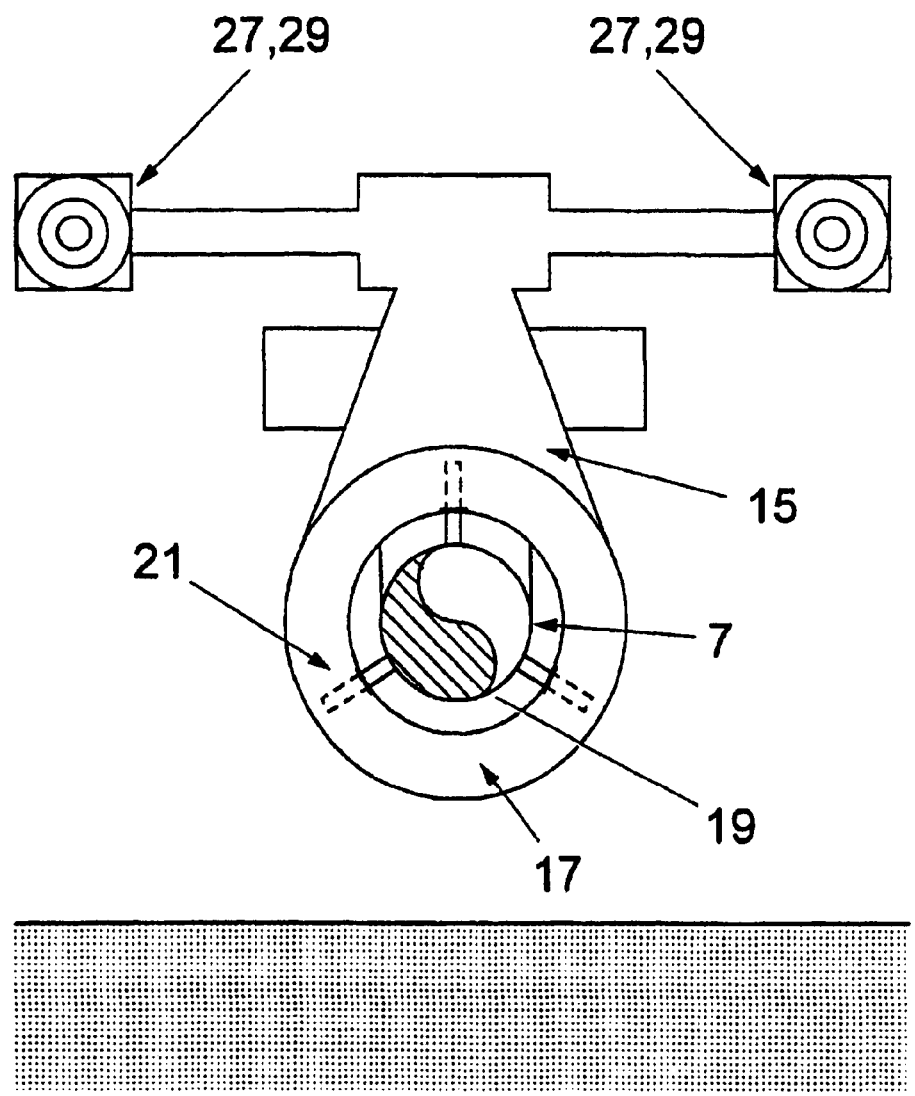
FIG. 3 is an end view of the portion shown in FIG. 2.

FIGS. 2 and 3 show the TDM 9 in more detail. The TDM 9 comprises a body member 15 which has a cylindrical portion 17 having an internal bore 19. Three roller wheels 21 are mounted on the cylindrical portion 17 and are equi-spaced around the internal bore 19, such that a proportion of the roller wheels 21 protrude into the internal bore 19. The roller wheels 21 are mounted on the cylindrical portion 17 by a biasing device (not shown) which biases the roller wheels 21 inwardly into the internal bore 19. The mounting of the roller wheels 21 with the biasing device provides the advantage that irregularities on the outer surface of the pipeline 7 will be compensated for. The two ends 18A, 18B are frusto-conical in shape, and taper inwardly, and as such form a funnel into which the pipeline 7 is fed.

Mounted on the upper arm of the body member 15 is a transponder 23 which radios back to the vessel 3 the spatial location of the body member 15, in the form of x, y, z orthogonal co-ordinates. An example of a suitable transponder is a Nautronix ATS/ABM210(™), or a Sonardyne SHT 316/319(™). The cable line 10 is shown as being attached to the upper arm of the body member 15, as in the control line 13. Mounted within the upper arm of the body member 15 is an arrangement of buoyancy material 25 which provides the TDM 9 with a self-righting capability, such that the TDM 9 will remain in a substantially upright position, as shown in FIGS. 2 and 3.

A sonar system 27 is mounted on the upper overhang 26 of the upper arm of the body member 15, where the sonar system 27 is configured to transmit sonar signals 28 downwardly toward the pipeline 7 and the sea bed 4, and thus provides the relative position of the pipeline 7 to the seabed 4. An example of a suitable sonar system 27 is a RESON SEABAT 9002(™). Two sonar systems 27 may be provided, as shown in FIG. 3. Alternatively, a single sonar system 27 may be mounted on the upper overhang 26. Also mounted on the upper overhang 26 are a pair of video cameras 29, which are also configured to look downwardly, and which provide a stereo viewing system in order to view the pipeline 7 and the sea bed 4.

In use, the TDM 9 is deployed from the barge 3 by paying out the cable line 10, and the control line 13, whilst the pipeline 7 passes through the internal bore 19. The cable 10 and control 13 lines are payed out until the TDM 9 is located a short distance above the sea bed 4. With the sonar system 27 and the stereo video system 29 operational, the data output from the systems 27, 29 is relayed to the vessel 3 via the control line 13. Markings (not shown) are spaced along the length of the outer surface of the cable line 10, and indicate to the operator of the apparatus 1 the length of cable line 10 between the vessel 3 and the TDM 9.

Thus, the cable 10;12 and the control 13;14 lines, and the body members 15 are towed along the outer surface of the pipeline 7 as successive sections of pipe are welded to the pipeline 7 and the pipeline 7 is laid.

The information provided from the data output of the transponder 23 and the sonar system 27 provides an accurate depth of measurement of the sea bed 4 to which the pipeline 7 is being laid. The tension in the cable line 10 is measured on the barge 3. The radius of the pipeline dispensing system 6 mounted on the barge 3 is also known. The structural characteristics of the pipeline 7 are also known. Accordingly, by inputting this data into a computer running a suitable calculation programme, the touchdown point of the pipeline 7 is calculated, and also the catenary of the pipeline 7 is calculated.

The advantage of providing the stereo camera video system 29 is that the operator of the apparatus 1 can visually see the touchdown of the pipeline 7. The advantage of the sonar system 27 is that the visual touchdown viewing capability of the apparatus 1 is not dependent upon the visibility of the water at the sea bed 4.

In addition to the TDM 9, a Pipeline Guidance controL system (PGL) 11, also in accordance with the first and second aspects of the invention, may also be provided for use with the apparatus 1, particularly where the pipeline 7 is to be laid in extremely rocky conditions, for instance such as those found in the Straits of Gibraltar or on the coastline of Norway.

The PGL 11 is essentially a vertically inverted TDM 9, but faces in the opposite direction to the TDM 9. Also, the sonar system 27 and stereo camera video system 29 are configured to look downwardly to the sea bed 4 ahead of the location where the pipeline 7 is to be laid. Also, the PGL 11 has weighted material (not shown) to replace the buoyancy material 25 of the TDM 9, so that the PGL 11 remains in an upright position as shown in FIG. 1. The TDM 9 and PGL 11 may be provided with separate cable 10, 12 and control 13, 14 lines respectively as shown in FIG. 1. Alternatively, the TDM 9 and PGL 11 may be connected together in series by a cable line 10, 12 and a control line 13, 14.

A second embodiment of an apparatus for monitoring the laying of a pipeline from a barge in accordance with the first and second aspects of the present invention is not shown in the Figs., although incorporates some equivalent components to the first embodiment, and where this is the case, these components are denoted with like reference numerals.

With regard to the second embodiment, the pipeline 7 is again laid from the barge 3, and a TDM 9 is coupled to the barge 3 by cable 10 and control 13 lines. The TDM 9 again comprises a body member 15 which has a cylindrical portion 17 having an internal bore 19, with the pipeline 7 again passing through the internal bore 19. However, the monitoring means are not mounted on the body member 15 in the second embodiment, in contrast to the first embodiment, but are mounted on a Remotely Operated Vehicle (ROV) (not shown) which is tethered or connected to the body member 15 by an umbilical line (not shown) of fixed length, or of controlled length. Thus, as the body member 15 moves with respect to the pipeline 7 as the pipeline 7 is being laid, the ROV also moves with respect to the pipeline 7 in conjunction with the body member 15. Thus a conventional ROV with suitable monitoring means, for instance a sonar system 27 and a stereo camera video system 29, can be utilised in conjunction with the body member 15, to monitor the laying of the pipeline 7.

Figure 4:
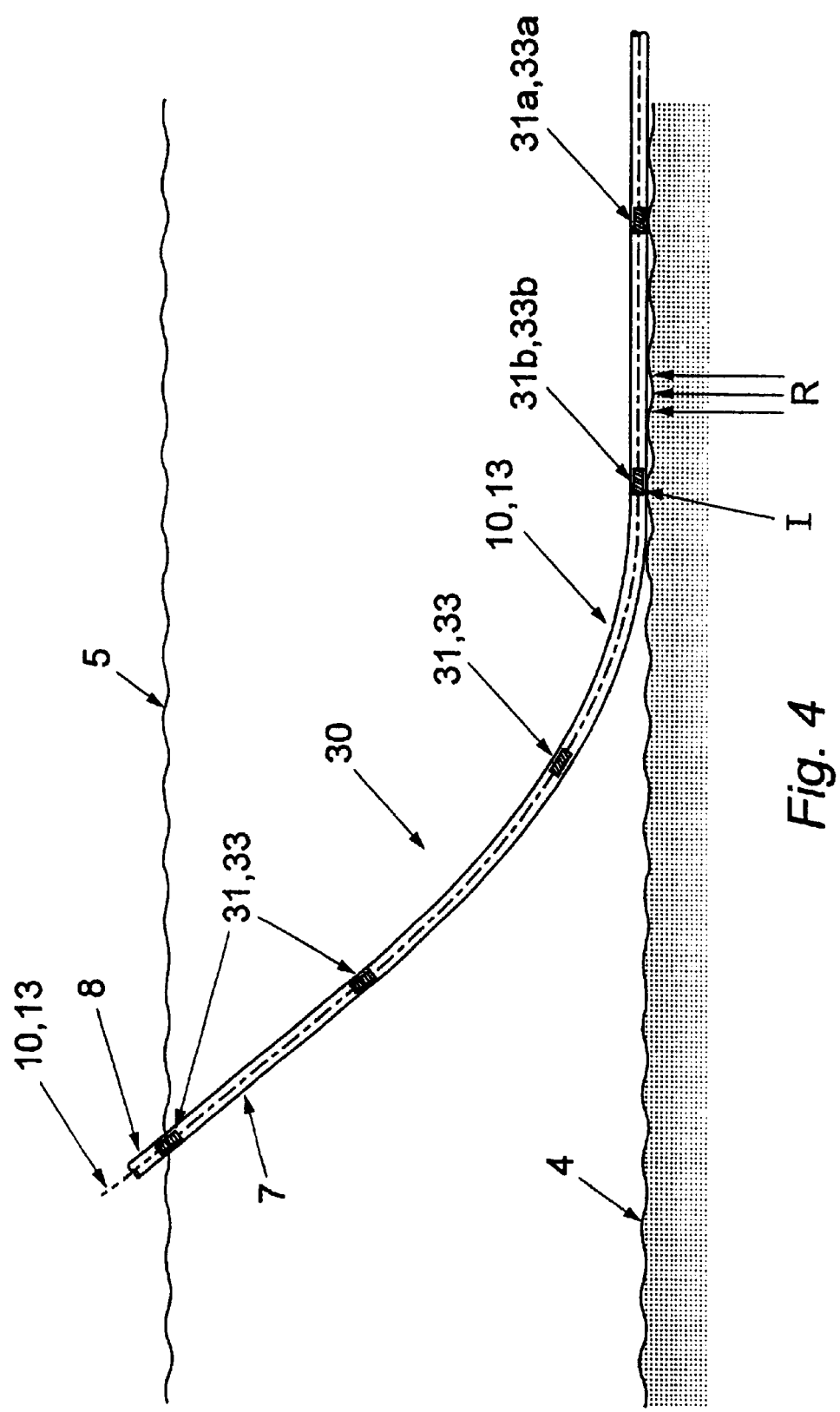
FIG. 4 is a side view of a portion of a third embodiment of the first aspect of the invention.

FIG. 4 shows a third embodiment of an apparatus 30 in accordance with the first and second aspects of the present invention for monitoring the laying of a pipeline 7 from a barge 3 (shown in FIG. 5) similar to the barge 3 shown in FIG. 1. The upper portion 8 of the pipeline 7 of FIG. 4 extends back to the barge 3, as do the upper portions of the cable 10 and control 13 lines. A number of internal body members 31 are spaced along the length of the cable 10 and control 13 lines, in series. The body members 31 are movably coupled to the interior bore of the pipeline 7 by centralisers (not shown) having a suitable roller wheel arrangement (not shown) which ensure that the body members 31 are spaced apart from the interior surface of the pipeline 7. Also mounted on the body member 31 are inertial attitude sensors 33, the data output of which is coupled to the control line 13. The inertial attitude sensors 33 comprise an accelerometer (not shown) combined with an inertial unit (not shown). An example of a suitable accelerometer is a KISTLER 3 AXIS(™) accelerometer, and examples of companies that manufacture suitable inertial units are LITTON Industries or WATSON Industries.

Figure 5:
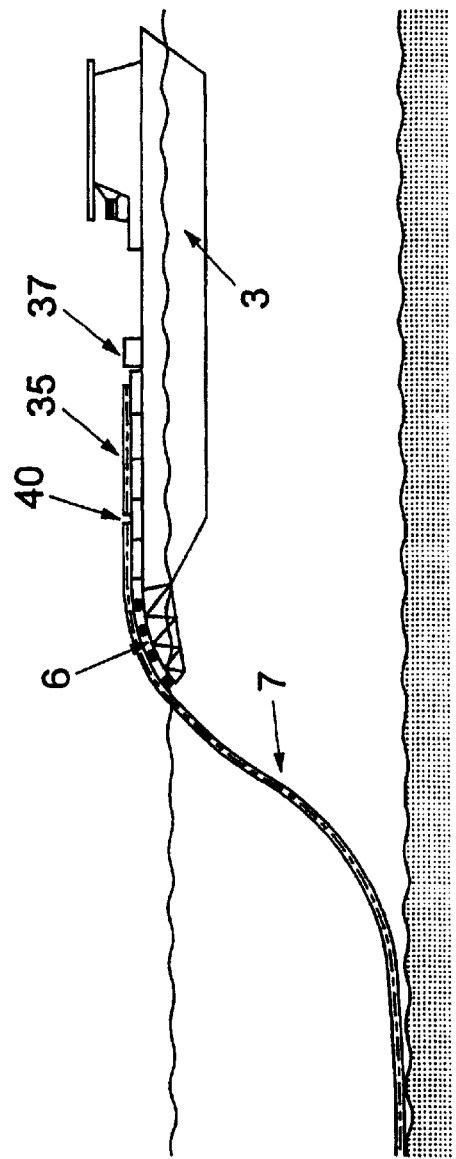
FIG. 5 is a side view of a conventional S-Lay system for laying a pipeline on the seabed.

As shown in FIG. 5, individual sections of pipe 35 are welded to the pipeline 7 on the lay barge 3 at point 40. The cable 10 and control 13 lines are initially held at point 37. Then, when another section of pipe 35 is required, the pipeline 7, cable 10 and control 13 lines are held at point 40, and the cable 10 and control 13 lines are freed at point 37, such that the new section of pipe 35 can be threaded over the exposed section of cable 10 and control 13 lines. The cable 10 and control 13 lines are then re-held at point 37 and are freed at point 40. The new section of pipe 35 can then be welded at point 40 to the pipeline 7.

Thus, the cable 10 and the control 13 lines, and the body members 31 and inertial attitude sensors 33 are towed through the internal bore of the pipeline 7 as successive sections of pipe 35 are welded at point 40 to the pipeline 7 and the pipeline 7 is laid.

FIGS. 6 and 7 show a second example of a barge, in this case a reel barge 45 in contrast to the lay barge 3 of FIGS. 1 and 5. The reel barge 45 comprises a conventional reel 47 which is supported by a conventional cradle 49. The pipeline 7 is preformed, prior to being dispensed, on the reel 47 by welding 1 Km sections of pipe together and coiling the pipeline 7 around the reel 47.

A fourth embodiment of an apparatus 50 for monitoring the laying of a pipeline 7 in accordance with the first and second aspects of the invention from a barge 45 is shown in FIG. 7. The upper portion of the pipeline 7 is dispensed from the reel 47, and the apparatus 50 is located within the pipeline 7 as in FIG. 4. The apparatus 50 comprises a number of internal body members 31 which are spaced along the length of a cable 10 and control 13 lines, in series. The body members 31 are again movably coupled to the interior bore of the pipeline 7, by centralisers, as before in the third embodiment of the first and second aspects of the present invention. Again as before, inertial attitude sensors 33 are mounted on the body member 31, the data output of which is coupled to the control line 13.

However, the upper ends of the cable 10 and control line 13 of the apparatus 50 are respectively coupled to a body 51, in the form of a weighted tracked vehicle 51, which is in accordance with the fourth and fifth aspects of the present invention. The apparatus 50 and the weighted tracked vehicle 51 are both initially located in the last section of pipe to be welded to the pipeline 7, and the tracks of the weighted vehicle 51 are initially locked to prevent the weighted vehicle 51 and the apparatus 50 from falling out of the end of the pipeline 7.

As can be seen in FIG. 7, the weighted tracked vehicle 51 is located at the lowest vertical position of the pipeline 7 which is yet to be deployed from the reel 47. As the pipeline 7 is being deployed from the reel 47, the tracks of the weighted vehicle 51 are unlocked, such that the weighted vehicle 51 will substantially remain in the position shown in FIG. 7, due to gravity, whilst the pipeline 7 is dispensed from the reel 47.

A data acquisition unit (not shown) is mounted on the weighted vehicle 51 and is coupled to the control line 13, and which initially stores the signals received from the inertial attitude sensors 33, and thereafter transmits the stored data to a data receiving unit (not shown) which is preferably located immediately below the weighted vehicle 51 below the reel 47.

The apparatus 30; 50 is deployed into the internal bore of the pipeline 7, such that a body member 31A is located adjacent, or behind the first point in which the pipeline 7 is fully restrained by the seabed 4, this point being denoted on FIGS. 4 and 7 as point R. Thus, with the body member 31A being located within a section of the pipeline 7 that is fully restrained, the sensor 33A detects no motion of the pipeline 7. The apparatus 30; 50 is also deployed within the internal bore of the pipeline 7 such that a body member 31B is located adjacent the point I of initial contact of the pipeline 7 with the sea bed 4. Thus, the sensor 33B reports via the control line 13 the initial contact at point I of the pipeline 7 with the sea bed 4.

Thus, the apparatus 30; 50 enables a real time deflected shape picture of the pipeline 7 to be generated, as the pipeline 7 is installed. The pipeline 7 touchdown point on the sea bed 4 can be defined in terms of the initial point of contact I and the fully restrained point of contact R.

The apparatus 30; 50 also provides for the survey and monitoring of variation of the longitudinal axis of the pipeline 7, where such a survey is known as an "Out Of Straightness" (OOS) survey of the as laid pipeline 7. The OOS survey is developed by analysis of the data output of the inertial attitude sensor 33A, as the body member 31A moves along the pipeline 7, behind the pipeline fully restrained point of contact R.

Additional body members 31 may be interspersed along the length of the cable 10 and control 13 lines, where these body members 31 may have appropriate sensors mounted thereon, such as for instance a conventional pipeline 7 buckle detector (not shown). The pipeline 7 buckle detector comprises a disc, the outer circumference of which forms a clearance fit with the inner diameter of the throughbore of the pipeline 7. A deformable material is mounted around the outer circumference of the disc which is pulled through the pipeline 7. Thus, buckles in the pipeline 7 produce marks in the deformable material. It is more likely that the buckle detector may be mounted on the body member 31A, where the outer diameter of the buckle detector is in the order of a few mm thinner than the inner diameter of the pipeline 7.

Conventionally, it is known to push equipment arranged on one end of, or along the length of, a cable 10 into a pipeline 7 by having a close fit between the end of the cable 10, by means of e.g. buckle detector, and the inner bore of the pipeline 7, and blowing the end of the cable 10 into the pipeline 7 with pressurised air. However, this procedure can take several hours to complete, and is dependent upon the integrity of the pipeline 7.

Preferably, a tractor unit (not shown) is attached to the cable 10 either instead of, or as well as, the body member 31A, such that this tractor unit can be operated to pull the whole cable 10 into the pipeline 7. This tractor unit is arranged to, preferably, provide friction between it and the pipeline 7 in the reverse direction; that is the direction of pulling the cable 10 out of the pipeline 7. Thus, this tractor unit, and cable 10 is unlikely to roll back down an incline and hit the next body member 31B.

Additionally, a high resolution camera, typically with associated lamps, may be coupled to one or both of the cable 10 and control 13 lines of the third and fourth embodiments of the apparatus 30; 50 in accordance with the first and second aspects of the present invention, and preferably be arranged to be located at a point where the pipeline 7 experiences relatively high levels of stress e.g. at the overbend point of the pipeline 7 which is traversing the pipeline dispensing system 6 as shown in FIG. 5. The high resolution camera would permit the operator to monitor the picture of the internal shape and ovality of the pipeline 7, which is critical to the integrity of the pipeline 7.

Additionally, a body member 31 may be replaced by a pipeline sealing device, in accordance with the third aspect of the invention, such as an explosive welding device (not shown) that comprises a hollow cylindrical member which has one of its ends closed. The hollow cylindrical member forms a clearance fit with the internal bore of the pipeline 7, and has explosive material mounted within the hollow. When the explosive material is triggered, the resulting explosion seals, or welds, the cylindrical member to the internal bore of the pipeline 7, and hence can be used to isolate the pipeline 7 in the event of accidental flooding or damage occurring to the pipeline 7.

The embodiment of the fourth and fifth aspects of the invention shown in FIG. 7 has the particular advantage that it permits the apparatus 50 to be deployed within the interior of a pipeline 7 laid from a reel 47, by utilising the weight of the weighted vehicle 51 being greater than the weight of the apparatus 50 acting upon the weighted vehicle 51.

Modifications and improvements may be made to the embodiments without departing from the scope of the invention. For instance, the embodiment of the fourth and fifth aspects of the invention shown in FIG. 7 could be modified to have the weighted tracked vehicle 51 replaced by a tracked vehicle which maintains a set position within the reel 47 by means of location sensor (not shown) receiving data from a location emitter (not shown) to the reel 47 outside the pipeline 7. Also, a roller wheel arrangement (not shown) could be applied to the cable 10 and control 13 lines located between the weighted tracked vehicle 51 and the interior bore of the pipeline 7 retained on the reel 47, in order to reduce the friction created between the cable 10 and control 13 lines and the pipeline 7.

What is claimed is:

1. Apparatus for monitoring the laying of an underwater pipeline, the pipeline being laid from a pipeline dispenser, the apparatus comprising a plurality of body members; monitoring means connected to each of the body members for monitoring the pipeline as it is laid; the body members being moveable with respect to the pipeline; and a means to position the body members a distance from the pipeline dispenser; wherein the apparatus is capable of generating a deflected shape picture of the pipeline.

2. An apparatus in accordance with claim 1, wherein the means to position the body member comprises a coupling means which maintains a distance between the pipeline dispenser and the body member.

3. An apparatus according to claim 2, wherein the maintained distance is known.

4. An apparatus according to claim 2, wherein markings are located along the length of the coupling means to indicate the distance between the pipeline dispenser and the body member.

5. An apparatus according to claim 2, wherein the coupling means is a tether.

6. An apparatus according to claim 1, wherein a movement means is provided to assist movement of the body member with respect to the pipeline.

7. An apparatus according to claim 6, wherein the movement means is a roller mechanism.

8. An apparatus according to claim 1, wherein the pipeline dispenser is located on a vessel at or adjacent the water surface, where the pipeline is laid from the vessel onto the seabed.

9. An apparatus according to claim 8, further comprising a transmission means for transmitting data output by the monitoring means to the vessel.

10. An apparatus according to claim 8, wherein a second body member is provided for monitoring of a portion of the seabed prior to the pipeline being laid on that portion of the seabed.

11. An apparatus according to claim 1, wherein the body member is in contact with the internal surface of the pipeline.

12. An apparatus according to claim 11, wherein the body member is moveable through the internal bore of the pipeline.

13. An apparatus according to claim 11, wherein the monitoring means provides for monitoring of variation of the longitudinal axis of the pipeline.

14. An apparatus according to claim 11, wherein the monitoring means includes a pipeline buckle detector.

15. An apparatus according to claim 11, wherein a body member is located within the pipeline at the location where the pipeline first makes contact with the sea bed.

16. An apparatus according to claim 11, wherein the apparatus further comprises a selective sealing device, which seals the pipeline when operated.

17. An apparatus according to claim 16, wherein the selective sealing device is an explosive welding device.

18. An apparatus according to claim 1, wherein the monitoring means include at least one of a sonar transmitter and a sonar receiver.

19. An apparatus according to claim 1, wherein the monitoring means include a visual viewing means.

20. An apparatus according to claim 1, wherein the body member includes a self righting means.

21. An apparatus according to claim 1, wherein the body member includes a buoyancy means.

22. An apparatus according to claim 1, wherein the body member is moveable with respect to the pipeline along the longitudinal axis of the pipeline.

23. An apparatus according to claim 1, wherein movement of the body member with respect to the pipeline in the radial direction of the pipeline is resisted.

24. An apparatus according to claim 1, wherein the body members are coupled to an elongate member, and further comprising a deployment mechanism for deploying the elongate member within the pipeline, the deployment mechanism comprising a body structure and a positioning means which maintains the body structure substantially in a known position within the pipeline.

25. An apparatus according to claim 24, wherein the body structure is located within a first portion of the pipeline which is vertically lower than second and third portions of the pipeline adjacent both ends of the first portion.

26. An apparatus according to claim 24, wherein the weight of the body structure is greater than the weight of the elongate member coupled to and acting upon the body structure.

27. An apparatus according to claim 26, wherein the weight of the body structure maintains the body structure within the first portion of the pipeline as the pipeline is dispensed from the dispenser.

28. An apparatus according to claim 24, wherein there is no secured connection between the body members and the dispenser.

29. An apparatus according to claim 28, wherein the distance between the body structure and the body members is fixed by the elongate member, such that when the body structure is stationary with respect to the pipeline, the body members are also stationary.

30. An apparatus according to claim 24, wherein the pipeline dispenser comprises a reel whereby the pipeline is coiled around the reel prior to dispensing thereof.

31. An apparatus according to claim 24, wherein a movement means is provided to assist the body structure to move substantially freely with respect to the pipeline.

32. An apparatus according to claim 31, wherein the movement means comprises a motive mechanism which permits the body structure to travel through the pipeline, and to pull the elongate member through the pipeline.

33. A method of monitoring the laying of an underwater pipeline being laid from a pipeline dispenser, the method comprising providing a plurality of body members moveable relative to the pipeline; providing a means to position the body members a distance from the pipeline dispenser, each of the body members having monitoring means associated therewith, and paying out the pipeline from the pipeline dispenser, such that the monitoring means provides data with respect to the pipeline as it is laid, wherein the data is capable of generating a deflected shape picture of the pipeline.

34. A method according to claim 33, wherein the pipeline dispenser is located on a vessel at or adjacent the water surface.

35. A method according to claim 33, wherein the pipeline is laid on the seabed.

36. A method according to claim 33, wherein the body member is in contact with the internal surface of the pipeline.

37. A method according to claim 33, wherein the body members are coupled to an elongate member which is further coupled at one end to a body structure, the method further comprising the steps of deploying the elongate member within the pipeline; inserting the body structure within the pipeline, the body structure being moveable along a longitudinal axis of the pipeline, and paying out the pipeline from a dispenser, the body structure being maintained substantially in a known position within the pipeline by a positioning means.

38. Apparatus for monitoring the laying of an underwater pipeline, the pipeline being laid from a pipeline dispenser, the apparatus comprising a body member; a monitoring means connected to the body member for monitoring the pipeline as it is laid; the body member being moveable with respect to the pipeline; and a means to position the body member a distance from the pipeline dispenser, wherein the pipeline dispenser is located on a vessel at or adjacent the water surface, where the pipeline is laid from the vessel onto the seabed and wherein a second body member is provided for monitoring of a portion of the seabed prior to the pipeline being laid on that portion of the seabed.

39. An apparatus according to claim 38, wherein the body member is in contact with the external surface of the pipeline.

40. An apparatus according to claim 39, wherein the body member includes a bore, whereby the pipeline is moveable through the said bore.

41. An apparatus according to claim 40, wherein the apparatus monitors the pipeline that has moved through the bore of the body member.

42. An apparatus according to claim 39, wherein the monitoring means includes an inertial attitude sensor.

43. Apparatus for monitoring the laying of an underwater pipeline, the pipeline being laid from a pipeline dispenser, the apparatus comprising a body member; a monitoring means connected to the body member for monitoring the pipeline as it is laid; the body member being moveable with respect to the pipeline; and a means to position the body member a distance from the pipeline dispenser; wherein the body member is in contact with the internal surface of the pipeline, and the apparatus further comprises a selective sealing device, which seals the pipeline when operated, wherein the selective sealing device is an explosive welding device.

* * * * *